(12) United States Patent
Park et al.

(10) Patent No.: US 10,818,057 B2
(45) Date of Patent: Oct. 27, 2020

(54) SPHERICAL CONTENT EDITING METHOD AND ELECTRONIC DEVICE SUPPORTING SAME

(71) Applicant: Samsung Electronics Co., Ltd., Suwon-si, Gyeonggi-do (KR)

(72) Inventors: Mi Ji Park, Seoul (KR); Kyung Hwa Seo, Seongnam-si (KR); Kyoung Soo Yoon, Suwon-si (KR); Jae Han Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/306,108

(22) PCT Filed: May 12, 2017

(86) PCT No.: PCT/KR2017/004941
§ 371 (c)(1),
(2) Date: Nov. 30, 2018

(87) PCT Pub. No.: WO2017/209409
PCT Pub. Date: Dec. 7, 2017

(65) Prior Publication Data
US 2019/0295299 A1 Sep. 26, 2019

(30) Foreign Application Priority Data

Jun. 2, 2016 (KR) .................. 10-2016-0068774

(51) Int. Cl.
*G06T 11/60* (2006.01)
*H04N 5/225* (2006.01)
(Continued)

(52) U.S. Cl.
CPC ............... *G06T 11/60* (2013.01); *G06T 7/90* (2017.01); *G11B 27/00* (2013.01); *G11B 27/031* (2013.01);
(Continued)

(58) Field of Classification Search
CPC ............... G09G 5/14; G09G 2340/10; G09G 2340/125; G06T 11/60; G06T 19/00; H04N 5/44504; G06F 9/44458; G06F 3/0481
See application file for complete search history.

(56) References Cited

U.S. PATENT DOCUMENTS 9,692,965 B2    6/2017  Hayashi
9,807,291 B1 *  10/2017 Tome ................. H04N 1/00204
(Continued)

FOREIGN PATENT DOCUMENTS

EP    2 627 072 A1    8/2013
JP    H11-328443 A    11/1999
(Continued)

OTHER PUBLICATIONS

Evening; Martin; Adobe Photoshop CS3 for Photographers; 2007.*
(Continued)

*Primary Examiner* — Todd Buttram
(74) *Attorney, Agent, or Firm* — Jefferson IP Law, LLP

(57) ABSTRACT

An electronic device is provided. The electronic device includes a memory storing spherical content, at least a portion of which is provided in the shape of at least a portion of a sphere with respect to a central point of an image, a display configured to output the spherical content, and a processor configured to be electrically connected with the memory and the display. The processor is configured to arrange a specified patch image on a central point of the spherical content when outputting the spherical content on (Continued)

the display. In addition, various embodiments ascertained through the specification are possible.

18 Claims, 12 Drawing Sheets

(51) Int. Cl.

| | | |
|---|---|---|
| *H04N 5/232* | (2006.01) | |
| *G06T 7/90* | (2017.01) | |
| *G11B 27/031* | (2006.01) | |
| *G11B 27/00* | (2006.01) | |
| *H04N 5/262* | (2006.01) | |
| *H04N 21/81* | (2011.01) | |
| *H04N 21/472* | (2011.01) | |
| *H04N 21/4545* | (2011.01) | |

(52) U.S. Cl.
CPC ....... *H04N 5/2258* (2013.01); *H04N 5/23206* (2013.01); *H04N 5/23238* (2013.01); *H04N 5/2628* (2013.01); *H04N 5/23229* (2013.01); *H04N 21/45455* (2013.01); *H04N 21/47205* (2013.01); *H04N 21/816* (2013.01)

(56) References Cited

U.S. PATENT DOCUMENTS

| | | | | |
|---|---|---|---|---|
| 2008/0143709 | A1* | 6/2008 | Fassero | G06T 3/00 345/419 |
| 2012/0306933 | A1* | 12/2012 | Osako | A63F 13/26 345/672 |
| 2014/0085412 | A1 | 3/2014 | Hayashi | |
| 2016/0092750 | A1* | 3/2016 | Lee | G06F 16/583 382/201 |
| 2017/0039436 | A1* | 2/2017 | Chen | G06K 9/00798 |
| 2017/0193324 | A1* | 7/2017 | Chen | G06K 9/3241 |
| 2017/0287107 | A1* | 10/2017 | Forutanpour | G06T 3/0062 |

FOREIGN PATENT DOCUMENTS

| | | |
|---|---|---|
| JP | 2007-081925 A | 3/2007 |
| KR | 10-2004-0001300 A | 1/2004 |
| KR | 10-0735676 B1 | 7/2007 |
| KR | 10-2015-0091798 A | 5/2015 |

OTHER PUBLICATIONS

John Houghton: "PTGUI PRO (V9)—Viewpoint Tutorial", Apr. 9, 2012 (Apr. 9, 2012), XP055582036, Retrieved from the Internet: URL:http://www.johnhpanos.com/ptgvpt.htm [retrieved on Apr. 17, 2019]* p. 1, paragraph 1 * Bottom Figure; p. 3*Upper Figure; p. 2*Last Paragraph; p. 1*Last two Lines; p. 3.

European Office Action dated Jul. 5, 2019; Reference #: P6081099PCT/EP; Application #/Patent #: 17806902.7-1209 /3460745 PCT/KR2017004941.

360facil.com; Adding an Image Logo At the Nadir of a Spherical Panorama; Image Logo to Complete a Spherical Panorama / 360 Easy—Complete Tutorial on 360 Degree Photography; http://www.360facil.com/eng/360-degree-photo-spherical-panorama-edition-with-logo-aligned-shots-logo-image.php; May 20, 2014.

* cited by examiner

SPHERICAL CONTENT EDITING METHOD AND ELECTRONIC DEVICE SUPPORTING SAME

TECHNICAL FIELD

The present disclosure relates to image editing.

BACKGROUND ART

Recently, with the appearance of a virtual reality (VR) device, there has been a growing interest in spherical content capable of being used in VR, augmented reality (AR), or the like. The spherical content may include content capable of being identified at 360 degrees with respect to a viewing point. The spherical content may be generated using, for example, cameras capable of being located in forward and backward directions and capturing a specified angle or more.

DISCLOSURE

Technical Problem

When spherical content is generated using a camera, a structure, an instrument, a means (e.g., a tripod, a hand, or the like), or the like located at a lower end (or a lower portion) of the camera may be captured as well. In this process, there is a problem in which a structure image at a point where a lower structure of the camera is located in the spherical content is represented in an awkward manner, for example, the structure image is twisted or at least a portion of the structure image is shown cut.

An aspect of the present disclosure is to provide a method for editing spherical content to more easily and intuitively edit content and an electronic device for supporting the same.

Technical Solution

In accordance with an aspect of the present disclosure, an electronic device is provided. The electronic device may include a memory storing spherical content, at least a portion of which is provided in the shape of a portion of a sphere with respect to a central point, a display configured to output the spherical content, and a processor configured to be electrically connected with the memory and the display. The processor may be configured to arrange a specified patch image on a central point of the spherical content.

In accordance with another aspect of the present disclosure, a method for editing spherical content is provided. The method may include displaying spherical content, at least a portion of which is provided in the shape of a portion of a sphere with respect to a central point, detecting a central point of the spherical content, and outputting a specified patch image on the central point of the spherical content.

Advantageous Effects

Various embodiments may be more easy and intuitive to edit at least a partial region of spherical content and may edit the at least partial region of the spherical content in a manner suitable for the user's taste.

MODE FOR INVENTION

Figure 1:
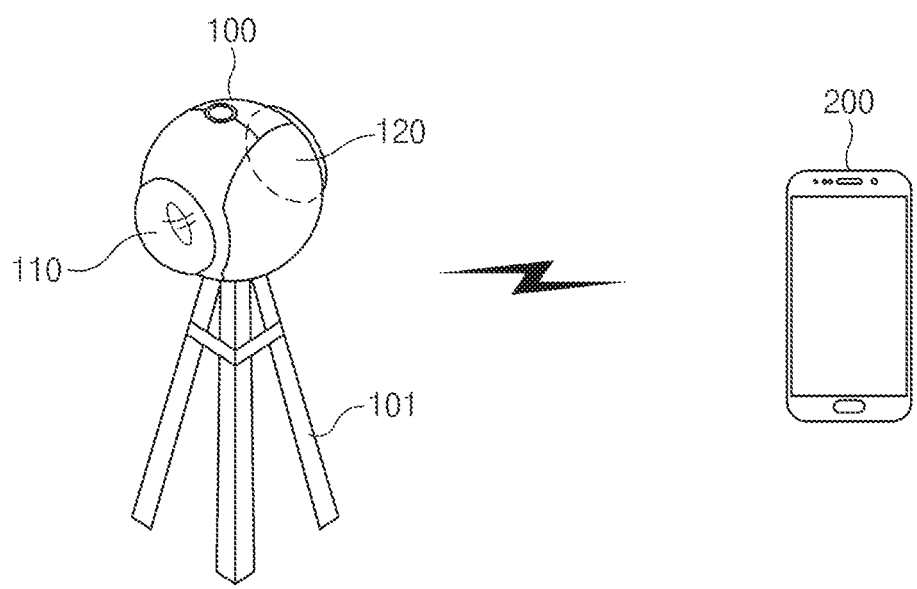
FIG. 1 illustrates an example of a spherical content operation system according to an embodiment of the prevent disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the various embodiments may be used to refer to various components regardless of the order and/or the priority, but do not limit the components. The terms may be used to distinguish the relevant components from other components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMDs), an electronic apparel, electronic bracelets, electronic necklaces, an electronic appcessory, electronic tattoos, a smart mirror, or a smart watch.

According to various embodiments, the electronic device may be a smart home appliance. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global positioning system (GPS) receiver, event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates an example of a spherical content operation system according to an embodiment of the prevent disclosure.

Referring to FIG. 1, the spherical content operation system of the present disclosure may include a first electronic device 100 and a second electronic device 200. Hereinafter, an embodiment is exemplified as a first electronic device is the image acquisition device 100 for obtaining an image and as a second electronic device is the terminal electronic device 200 for receiving and outputting spherical content, with respect to respective electronic devices configuring the spherical content operation system of the present disclosure. The spherical content may include an image, at least a portion of which is a portion of a sphere with respect to a central point. For example, the spherical content may include an image in which images of a predetermined angle range from top to bottom and from side to side in a forward direction and images of a predetermined angle range from top to bottom and from side to side in a backward direction are consecutive with respect to a central point. Such spherical content may be output as any one of a mirror ball viewing image or a top-view image on a display of the terminal electronic device 200. The mirror ball viewing image may include an image which displays a partial image corresponding to a predetermined angle range in a forward direction with respect to a central point of the spherical content and displays a portion far away from the central point in a circle. The top-view image may include an image displayed in the form of looking down the central point from a location spaced apart from the central point of the spherical content at a predetermined interval.

The image acquisition device 100 may include an electronic device capable of capturing an image. According to an embodiment, the image acquisition device 100 may include a plurality of camera modules 110 and 120. The plurality of camera modules 110 and 120 may be located to obtain images of different angles. For example, the plurality of camera modules 110 and 120 may be arranged to capture front and rear images with respect to a specific point where the image acquisition device 100 is put. Alternatively, the plurality of camera modules 110 and 120 may be located to capture images of regions, each of which is divided every 120 degrees, while image capture ranges are not overlaid with each other or while at least some of the image capture ranges are overlaid with each other. Alternatively, the plurality of camera modules 110 and 120 may include a fisheye lens capable of capturing an angle greater than or equal to 180 degrees up and down and left and right in a forward direction while image capture ranges are not overlaid with each other or while at least some of the image capture ranges are overlaid with each other or a fisheye lens capable of an angle greater than or equal to 180 degrees up and down and left and right in a backward direction.

According to various embodiments, the plurality of camera modules 110 and 120 may be located in a fixed shape and may obtain an image in a forward direction, in a backward direction, or in a specified orientation. Alternatively, the plurality of camera modules 110 and 120 may be provided to be movable up and down and left and right on a housing of the image acquisition device 100. The image acquisition device 100 may change an image capture orientation in response to a user input or a control signal received from another electronic device and may capture an image in the changed orientation. The image acquisition device 100 may store the captured image in its memory. Alternatively, the image acquisition device 100 may transmit the captured image to a specified device (e.g., the terminal electronic device 200) in a downloading or streaming manner.

According to various embodiments, the image acquisition device 100 may further include a structure 101. The structure 101 may include a tripod for supporting the image acquisition device 100 or the like. The structure 101 may be provided to be removable from the image acquisition device 100. Thus, the structure 101 may be removed according to a user operation. The image acquisition device 100 may generate spherical content in which at least a portion of the structure 101 is captured and may provide the spherical content to the terminal electronic device 200 or a specified server.

The terminal electronic device 200 may establish a communication channel with the image acquisition device 100. The terminal electronic device 200 may transmit a control signal associated with controlling the image acquisition device 100, generated in response to specified schedule information or a user input, to the image acquisition device 100. The terminal electronic device 200 may receive an image captured by the image acquisition device 100 in real time from the image acquisition device 100 and may output the image. In this regard, the terminal electronic device 200 may establish a communication channel with the image acquisition device 100 in response to a user input and may request the image acquisition device 100 to transmit at least one image stored in the image acquisition device 100. The terminal electronic device 200 may store or output an image received from the image acquisition device 100. In such an operation, the terminal electronic device 200 may output a user interface capable of controlling the image acquisition device 100 on, for example, its display. For example, the terminal electronic device 200 may output a user interface associated with controlling image capture of the image acquisition device 100 and a user interface associated with controlling transmission of an image captured by the image acquisition device 100.

The terminal electronic device 200 may display spherical content provided from the image acquisition device 100. Furthermore, the terminal electronic device 200 may provide an edit screen capable of editing at least a partial region of the spherical content on the display. In this operation, the terminal electronic device 200 may provide a previously stored patch (e.g., a 2-dimension (2D) image, a 3-dimension (3D) image, or the like capable of being located on the at least partial region of the spherical content). Alternatively, the terminal electronic device 200 may provide a converted image or an item corresponding to the image to edit at least a partial region of the spherical content. Alternatively, the terminal electronic device 200 may access a server which provides a patch of a specified shape and may receive a patch from the server to provide the patch.

In the above description, an embodiment is exemplified as the spherical content operation system includes the image acquisition device 100. However, the image acquisition device 100 may be replaced with a server which provides spherical content. The server may receive and store spherical content from at least one image acquisition device or the at least one terminal electronic device 200 and may provide the spherical content to the terminal electronic device 200 in response to a request of the terminal electronic device 200. Furthermore, the server may provide a patch associated with editing at least a partial region of the spherical content in response to a request of the terminal electronic device 200.

Figure 2:
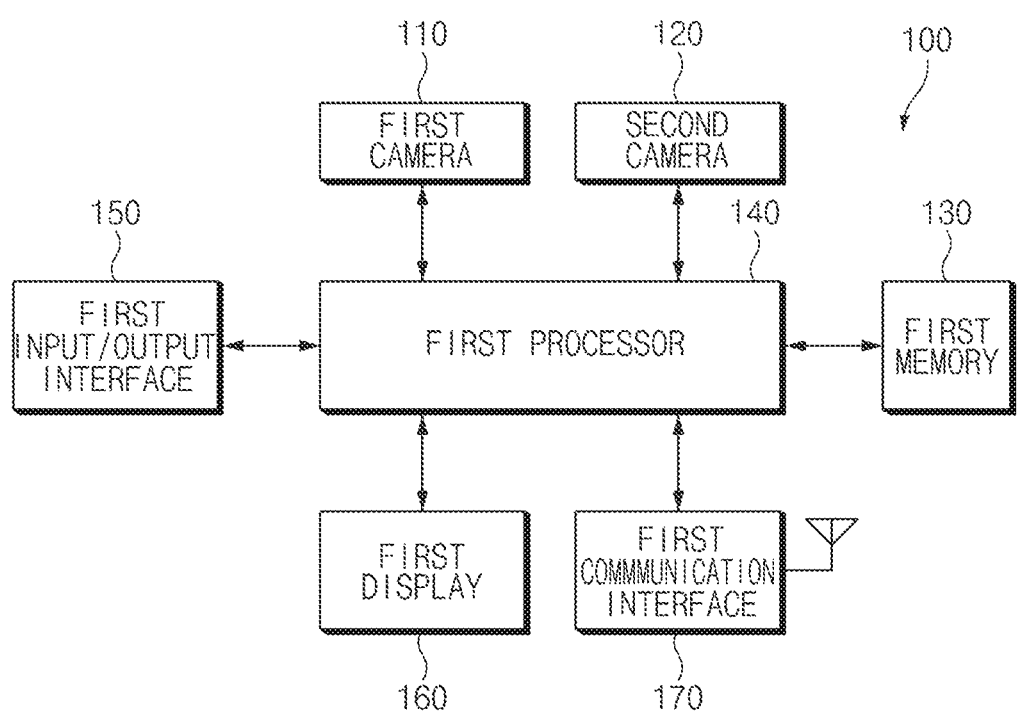
FIG. 2 illustrates an example of an image acquisition device according to an embodiment of the present disclosure.

FIG. 2 illustrates an example of an image acquisition device according to an embodiment of the present disclosure.

Referring to FIG. 2, an image acquisition device 100 of the present disclosure may include a first camera 110, a second camera 120, a first memory 130, a first processor 140, a first input/output interface 150, a first display 160, and a first communication interface 170.

The first camera 110 may obtain an image, for example, a subject, a landscape, or the like located in one direction. The first camera 110 may store the obtained image in the first memory 130 in response to control of the first processor 140. The image obtained by the first camera 110 may be transmitted to a terminal electronic device 200 via the first communication interface 170 in response to control of the first processor 140. The first camera 110 may obtain an image corresponding to a predetermined image capture angle (e.g., an image capture angle greater than or equal to 180 degrees). According to an embodiment, the first camera 110 may include a camera in which a fisheye lens having an image capture angle of about 195 degrees is located.

The second camera 120 may obtain an image such as a subject or a landscape located in another direction, at least a portion of which differs from a point where the first camera 110 is located. The second camera 120 may obtain an image of a predetermined image capture angle (e.g., an image capture angle greater than or equal to 180 degrees) the same or similarly to the first camera 110. According to an embodiment, the second camera 120 may include a camera in which a fisheye lens capable of capturing an image corresponding to a corresponding image capture angle range based on the specified image capture angle range is located similarly to the first camera 110. The image captured by the second camera 120 may be stored in the first memory 130 or may be transmitted to the terminal electronic device 200 via the first communication interface 170. The second camera 120 may be disposed in a direction which is symmetrical to the first camera 110 with respect a central portion of the image acquisition device 100. Thus, when the first camera 110 is located to face a forward direction, the second camera 120 may be disposed to face a backward direction (e.g., a direction opposite to the forward direction). According to various embodiments, the first camera 110 and the second camera 120 may be fixed. Alternatively, the first camera 110 and the second camera 120 may be disposed movably up and down and left and right or movably in an upward and downward direction. Alternatively, at least one of the first camera 110 or the second camera 120 may be located to be fixed to capture an image of a specified first direction (e.g., a forward or backward direction) with respect to a surface (e.g., a horizontal direction) where the image acquisition device 100 is put and be movable in a second different direction, for example, an upward and downward direction, while fixed in the first direction (e.g., the forward direction).

The first memory 130 may store at least one program or data associated with operating the image acquisition device 100. For example, the first memory 130 may store a program associated with operating the first camera 110 and the second camera 120. The first memory 130 may store each of an image captured by the first camera 110 and an image captured by the second camera 120 in response to control of the first processor 140. According to various embodiments, the first memory 130 may store a closed curve image of at least one of a ring shape, a cylindrical shape, or a globular shape, which stitches a first image captured by the first camera 110 and a second image captured by the second camera 120. At least one of the closed curve image stored in the first memory 130, the first image captured by the first camera 110, or the second image captured by the second camera 120 may be transmitted to the terminal electronic device 200 in real time or at a request time of the terminal electronic device 200 under control of the first processor 140. Alternatively, at least one of the closed curve image stored in the first memory 130, the first image, or the second image may be transmitted to a specified server depending on settings of the first processor 140. The first input/output interface 150 may perform signal processing associated with an input/output function of the image acquisition device 100. In this regard, the first input/output interface 150 may include at least one of at least one physical button, a touch pad, or a touch screen (e.g., the first display 160). Furthermore, the first input/output interface 150 may include an audio device. The audio device may include, for example, a microphone and may collect an audio based on the microphone. The first input/output interface 150 may transmit the collected audio information and an image to the terminal electronic device 200 or may transmit only the audio information to the terminal electronic device 200, in response to control of the first processor 140.

The first display 160 may output at least one object associated with controlling the image acquisition device 100. For example, the first display 160 may include a touch screen and may output a menu or at least one icon associated with controlling the image acquisition device 100. The first display 160 may output, for example, information corresponding to a current image capture state of the image acquisition device 100 (e.g., a state where at least one of the first camera 110 and the second camera 120 is operated or enabled), an image capture type (e.g., video capture, time lapse, video looping, or the like), or the like. Alternatively, the first display 160 may output a menu capable of changing an image capture type. Alternatively, the first display 160 may output an object corresponding to a state where the received image is transmitted. The video capture may include a manner to perform consecutive image capture from a time when image capture is requested and stop image capture upon a stop request. The time lapse may include a manner to perform video capture during a specified time on a predetermined time basis. The video looping may include a manner to perform video capture during only a specified time.

The first communication interface 170 may perform a communication function of the image acquisition device 100. The first communication interface 170 may include, for example, at least one short range communication module. According to an embodiment, the first communication interface 170 may include at least one of a Bluetooth communication interface, a Wi-Fi direct communication interface, or a soft access point (AP) interface. The soft AP may include a function of outputting Internet data, received over a LAN, over a wireless LAN. The first communication interface 170 may perform communication with the terminal electronic device 200 and may transmit spherical content stored in the first memory 130 to the terminal electronic device 200 in response to control of the first processor 140. Alternatively, the first communication interface 170 may transmit the stored spherical content to a specified server in response to control of the first processor 140.

The first processor 140 may control image capture using at least one of the first camera 110 and the second camera 120 depending on a user input which is input based on the first input/output interface 150 or the first display 160. Alternatively, the first processor 140 may execute a specified function in response to an image capture control signal, an image transmission signal, or the like received via the first communication interface 170. For example, when receiving an image capture control signal for requesting to start image capture from the terminal electronic device 200, the first processor 140 may perform image capture based on at least one of the first camera 110 and the second camera 120 in response to a type of the image capture control signal. Alternatively, the first processor 140 may capture an image using the first camera 110 and the second camera 120 at a predetermined period (or in real time) depending on specified schedule information and may stitch the captured images to generate spherical content. The first processor 140 may transmit the spherical content to the terminal electronic device 200 or a specified server at a predetermined period (or in real time).

According to various embodiments, the first processor 140 may receive an image capture control signal from a wearable electronic device capable of establishing a communication channel. The first processor 140 may capture an image in response to the image capture control signal received from the wearable electronic device and may generate spherical content based on the captured image, thus transmitting the generated spherical content to the terminal electronic device 200. Alternatively, the first processor 140 may establish a plurality of short range communication channels with the terminal electronic device 200. For example, the first processor 140 may establish a communication channel with the terminal electronic device 200 in a first communication mode (e.g., a communication mode based on a Bluetooth communication interface). When image transmission is stopped or when there is no image to be transmitted, the first processor 140 may control to maintain only a communication channel of the first communication mode and transmit and receive a control signal based on the communication channel. The first processor 140 may transmit an image in a second communication mode (e.g., a communication mode based on a Wi-Fi direct communication interface) in a process of transmitting the captured image.

Figure 3:
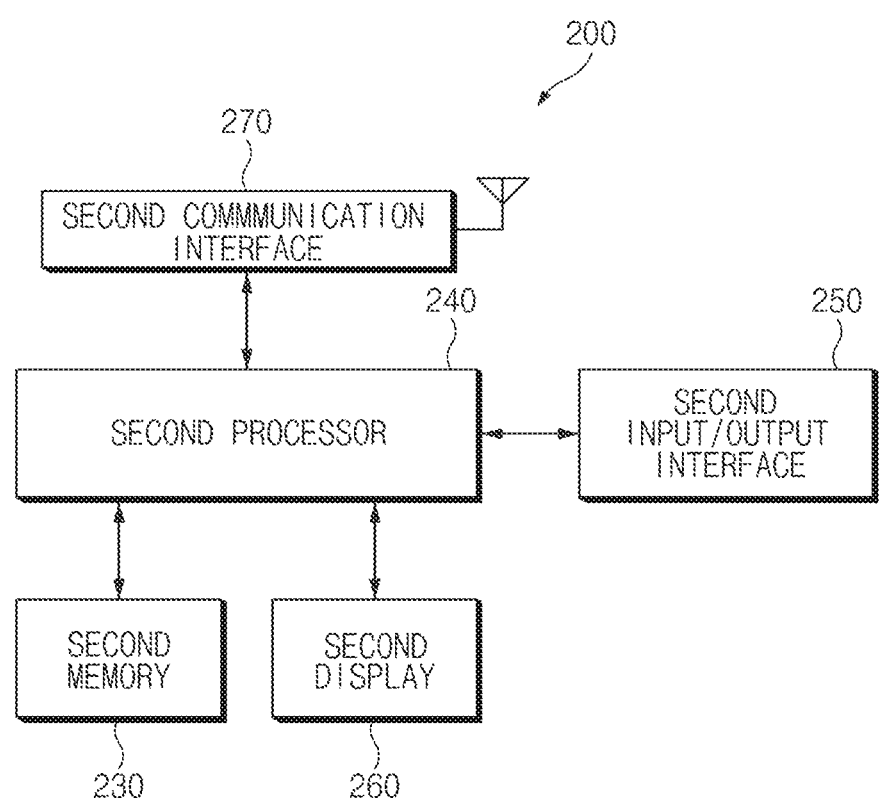
FIG. 3 illustrates an example of a terminal electronic device according to an embodiment of the present disclosure.

FIG. 3 illustrates an example of a terminal electronic device according to an embodiment of the present disclosure.

Referring to FIG. 3, a terminal electronic device 200 of the present disclosure may include a second memory 230, a second processor 240, a second input/output interface 250, a second display 260, and a second communication interface 270.

The second memory 230 may store a program or data associated with performing a function of the terminal electronic device 200. For example, the second memory 230 may store a kernel, middleware, an API, an application program, and the like. According to an embodiment, the second memory 230 may store connection information with an image acquisition device 100 or image list information stored in the image acquisition device 100. Alternatively, the second memory 230 may store at least one file corresponding to a first camera image and a second camera image provided from the image acquisition device 100 or at least one closed curve image provided from the image acquisition device 100 (e.g., spherical content in which the first camera image and the second camera image of the image acquisition device 100 are stitched). According to various embodiments, the second memory 230 may store spherical content received from a specified server.

In connection with the spherical content stored in the second memory 230, the second processor 240 may provide an edit function associated with at least a partial region of the spherical content. For example, the second processor 240 may output the spherical content on the second display 260 in response to a user input. The second processor 240 may output at least one patch image (e.g., a specific image capable of being located on at least a partial region of the spherical content) in response to a user input. In this regard, the second processor 240 may provide at least one of a function for outputting a patch list including at least one path, a function for converting a specified image into a patch image (e.g., a 2D circular image or a 3D image), or a function for receiving a patch image from a specified server.

According to various embodiments, while the terminal electronic device 200 interlocks with a head mount device (HMD), in connection with outputting an image through the HMD, the second processor 240 may convert a closed curve image into a virtual VR image and may output the converted virtual VR image. The virtual VR image may include an image in which at least a partial region of the closed curve image is arranged as display regions divided into a left-eye region and a right-eye region.

The second input/output interface 250 may play a role as, for example, an interface capable of transmitting instructions input from a user or data input from another external device to other component(s) of the terminal electronic device 200. Furthermore, the second input/output interface 250 may output instructions or data, received from other component(s), to the user or the other external device. According to an embodiment, the second input/output interface 250 may generate an input signal associated with controlling the image acquisition device 100, in response to a user input. For example, the second input/output interface 250 may generate an input signal for scanning the image acquisition device 100 or requesting a connection with the specified image acquisition device 100, an input signal associated with controlling image capture of the image acquisition device 100, an input signal for requesting to transmit an image of the image acquisition device 100, an input signal for capturing a specific image while content provided from the image acquisition device 100 is played back, or the like in response to a user input.

According to various embodiments, the second input/output interface 250 may include an audio device. The audio device may output at least one audio information associated with controlling the image acquisition device 100 (e.g., guidance information or an effect sound previously stored in connection with image capture state information or image transmission state information of the image acquisition device 100). Alternatively, the audio device may collect a voice signal associated with controlling image capture or image transmission of the image acquisition device 100 and may deliver a voice command extracted by voice recognition to the second processor 240. Based on this, the audio device may support to input a voice to control image capture or image transmission of the image acquisition device 100.

The second display 260 may include, for example, a liquid crystal display (LCD), a light-emitting diode (LED) display, an organic LED (OLED) display, a microelectromechanical systems (MEMS) display, or an electronic paper display. The second display 260 may display, for example, a variety of content (e.g., a text, an image, a video, an icon, a symbol, or the like). The second display 260 may include a touch screen and may receive, for example, a touch, a gesture, proximity, or a hovering input using an electronic pen or a part of a user's body.

According to an embodiment, the second display 260 may output various screens associated with editing spherical content. For example, in connection with the spherical content, the second display 260 may display a screen including a circular image of a certain size on a central portion and a background (e.g., a single-color background) located on a peripheral portion of the circular image. The spherical content may be displayed in various screen states over a displayed time point. For example, the second display 260 may output a mirror ball viewing image which displays a region far away from a start point of viewing in a circle, the start point of the viewing being located in a central portion of a lower end of the spherical content, wherein a central point of the spherical content is the start point of the viewing (e.g., watching, observing, or seeing content). Alternatively, the second display 260 may output a top-view image displayed in a form where the central point of the spherical content is located on a central portion of a screen (e.g., a central portion of a circular image).

The second communication interface 270 may establish, for example, communication between the terminal electronic device 200 and an external device (e.g., the image acquisition device 100). For example, the second communication interface 270 may be connected to a network through wireless communication or wired communication to communicate with the external device. The wireless communication may use at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM) as a cellular communication protocol.

Alternatively, the second communication interface 270 may include a short range communication module (e.g., a BT or Wi-Fi communication hardware interface) capable of communicating with the terminal electronic device (e.g., wearable electronic device 200 or the image acquisition device). The second communication interface 270 according to various embodiments may include at least one communication module capable of performing near field communication (NFC), magnetic stripe transmission (MST), scanner communication, or the like. According to an embodiment, the second communication interface 270 may receive spherical content from the image acquisition device 100. In this regard, the second communication interface 270 may perform peripheral scanning using a specific communication module (e.g., BT, Wi-Fi, soft AP, or the like as a short range communication module) in response to a user input and may establish a communication channel with the image acquisition device 100 based on the scanned information. Alternatively, the second communication interface 270 may receive spherical content from a server in response to a user input.

Figure 4:
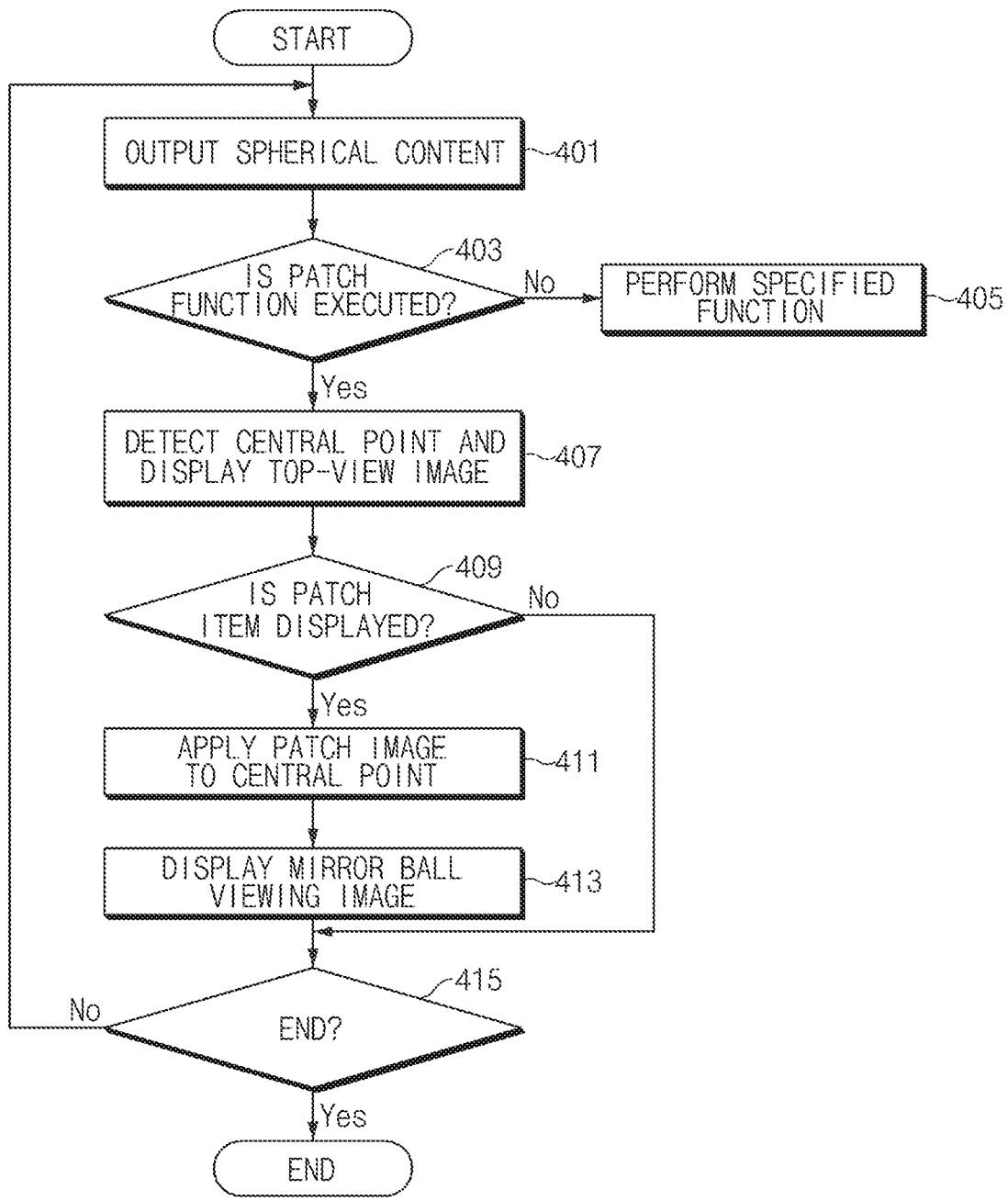
FIG. 4 illustrates an example of a method for editing spherical content according to an embodiment of the present disclosure.

FIG. 4 illustrates an example of a method for editing spherical content according to an embodiment of the present disclosure.

Referring to FIG. 4, in connection with the method for editing spherical content, in operation 401, a second processor 240 may output spherical content on a second display 260 in response to occurrence of a specified event (e.g., a user input, receiving the spherical content from an image acquisition device 100, accessing a specified server which provides the spherical content, receiving the spherical content from the server, and the like). A screen which displays the spherical content may include a circular image displayed at a constant size on the center of the screen and a background which covers the circular image. The circular image may include an image displayed in response to a certain view point of the spherical content. For example, as described above, the circular image may include at least one of a mirror ball viewing image and a top-view image.

In operation 403, the second processor 240 may determine whether an input event associated with executing a patch function corresponding to editing at least a partial region of the spherical content occurs. In this regard, the second processor 240 may output a menu item, an icon, or the like associated with editing the spherical content. When the event which occurred is not an input event associated with executing the patch function, in operation 405, the second processor 240 may perform a specified function according to a type of the event. For example, the second processor 240 may perform an e-mail function, a call function, a chat function, or the like according to a type of the event.

When the event associated with executing the patch function occurs, in operation 407, the second processor 240 may detect a central point of the spherical content and may display a top-view image. For example, the second processor 240 may detect a start point where an image is captured (e.g., a location where a camera is disposed) as the central point of the spherical content at a time when the spherical content is generated. In this regard, the second processor 240 may search portions where images are stitched among portions of the spherical content and may determine a stitching portion of a specified direction among the stitched portions as a central point of the image. The stitching portion may be a region where images are stitched. The second processor 240 may recognize a portion where a boundary between images is constant within a specified range as the stitching portion through image filtering and may determine an end point of a direction facing the center among the stitching portions as the central point of the spherical content. When the central point is detected, the second processor 240 may arrange the central point on the center of a screen and may display the top-view image in a direction facing the central point from a certain point of an outer portion (e.g., an outer portion of the spherical content) to display the top-view image in the form of a circular image. According to an embodiment, the second processor 240 may display a circular image facing the central point from an outer end of a direction perpendicular to an upper side with respect to the central point of the spherical content. According to an embodiment, the second processor 240 may output at least one patch item associated with applying a patch function, in a state where the spherical content is displayed in a manner to display the top-view image.

In operation 409, the second processor 240 may determine whether an event associated with selecting the patch item occurs. When a specified time elapses without the occurrence of the event associated with selecting the patch item, the second processor 240 may skip operation 411 or 413. Alternatively, the second processor 240 may maintain the output of a screen capable of selecting at least one patch item.

When the event associated with selecting the patch item occurs, in operation 411, the second processor 240 may apply a patch image corresponding to the selected patch item to the central point of the spherical content. For example, a patch image of a certain size, with a certain color or pattern or a specified 2-dimension (2D) or 3-dimension (3D) shape, may be located on the central point of the spherical content. Thus, the patch image may be disposed to cover a structure (e.g., a tripod or a hand) displayed to be twisted, be cut in at least a portion, or be overlapped in at least a portion, which is located on the central point of the spherical content.

After the patch item is applied, in operation 413, the second processor 240 may display the circular image in a manner to display a mirror ball viewing image. Thus, the patch image may be located and displayed on a central portion of a lower end of the circular image.

In operation 415, the second processor 240 may determine whether an event associated with ending the displaying of the spherical content occurs. When the event associated with ending the displaying of the spherical content does not occur, the second processor 240 may branch to operation 401 to perform the operation from operation 401 again or may branch to operation 407 to output a screen for selecting a patch item.

Figure 5:
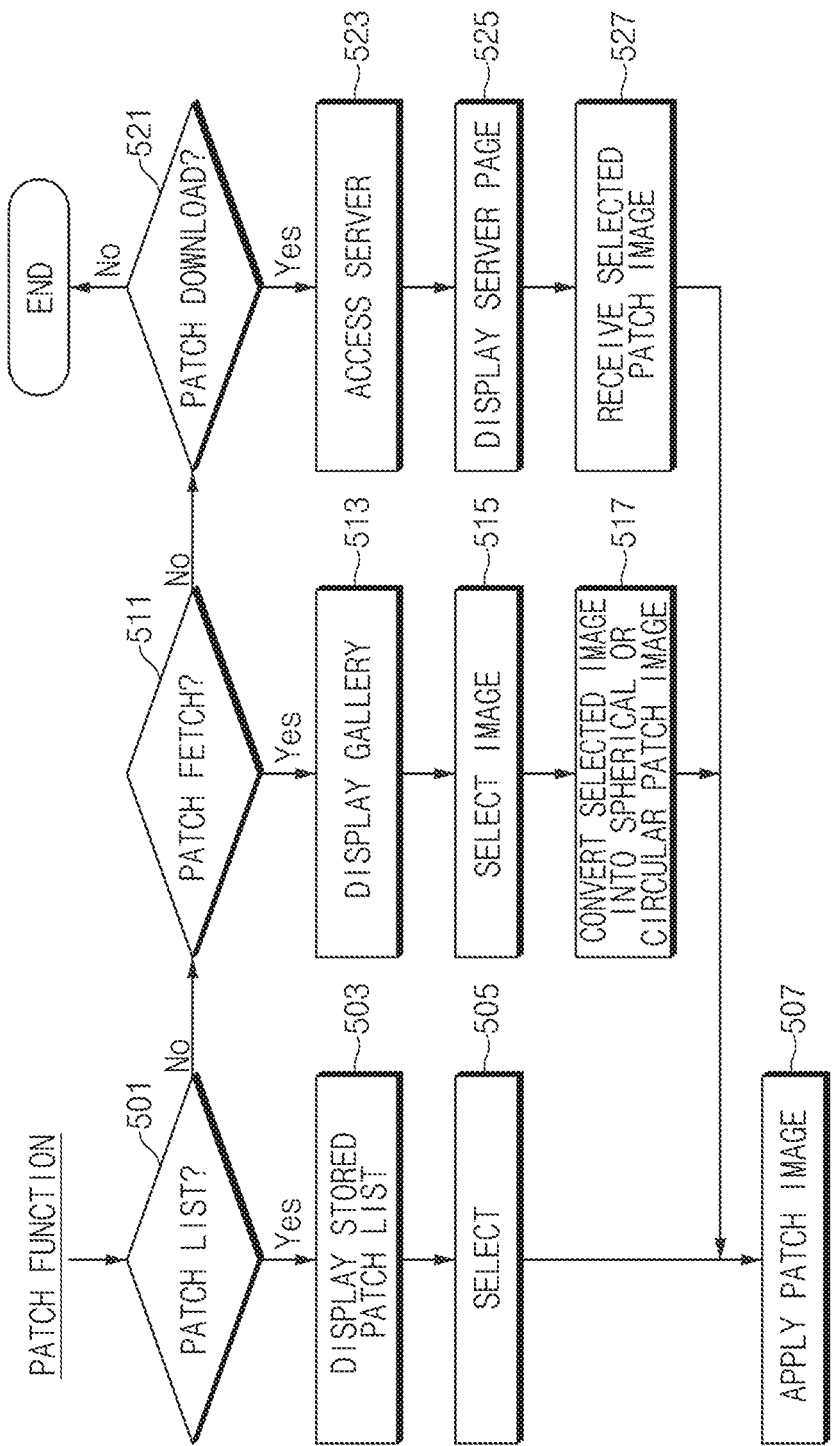
FIG. 5 illustrates an example of a method associated with operating a patch function according to an embodiment of the present disclosure.

FIG. 5 illustrates an example of a method associated with operating a patch function according to an embodiment of the present disclosure.

Referring to FIG. 5, in connection with operating the patch function, a second processor 240 may be configured to provide an icon or menu capable of providing at least one of functions of providing a patch list, providing a conversion item, and downloading a patch, described below, as a default or selecting any one of the functions.

For example, when an event associated with selecting a patch item occurs, in operation 501, the second processor 240 may determine whether the corresponding event is an event associated with a request associated with outputting a patch list. According to an embodiment, the second processor 240 may be configured to output a patch list as a default (or automatically or basically) on a second display 260 in connection with executing a patch function. Alternatively, the second processor 240 may be configured to provide an icon or menu associated with outputting the patch list on a screen where spherical content is displayed. When the event which occurred is a request associated with outputting the patch list (e.g., a user input, a request to execute a patch function), in operation 503, the second processor 240 may display a stored patch list. The second processor 240 may be configured to search for or select at least one patch item from the patch list.

In operation 505, when a specified event occurs, the second processor 240 may select a patch item in response to the corresponding event. In operation 507, the second processor 240 may apply a patch image corresponding to the selected patch item (e.g., arrange the patch image at a specified size on a partial region of spherical content (e.g., a central point of the spherical content)). According to various embodiments, the second processor 240 may be configured to display edit items capable of adjusting at least one of a size, a color, or a shape of the displayed patch image in the operation of applying the patch image.

When the event which occurred is unrelated to outputting the patch list, in operation 511, the second processor 240 may determine whether the event which occurred is an event associated with fetching a patch. The second processor 240 may be configured to output a specified menu or icon on a second display 260 in connection with a patch fetch function. Alternatively, when an event for requesting to execute a content edit function occurs, the second processor 240 may apply the patch fetch function to a default. When the patch fetch event occurs, in operation 513, the second processor 240 may be configured to output a specified image folder, for example, a gallery execution screen on the second display 260. Alternatively, the second processor 240 may be configured to output a screen where an image download folder as the specified image folder is executed. In operation 515, the second processor 240 may receive an event associated with selecting an image. In operation 517, the second processor 240 may convert the selected image into a spherical patch. In this operation, the second processor 240 may output a conversion interface associated with being converted into the spherical patch. In connection with the conversion interface, the second processor 240 may automatically convert the selected image into a 2D or 3D spherical shape. The second processor 240 may adjust a size, shape, color, or the like of the converted image depending on a user input. In connection with adjusting a 3D patch, the second processor 240 may support to set an initial display direction (or display surface). The second processor 240 may be configured to apply and display the converted spherical patch to a central point of spherical content.

According to various embodiments, in connection with 2D patch conversion, the second processor 240 may extract the selected image as a circular image of a specified size with respect to a central point of the selected image or at least one object. In connection with 3D patch conversion, the second processor 240 may automatically select a specified object (e.g., an object disposed on a specified location, an object of a specified size, shape, or the like, or the like) from the selected image or may select at least one object in response to a user input and may perform 3D modeling of the selected object based on a specified algorithm to perform spherical patch conversion. The specified algorithm may include, for example, instructions to select a previously stored 3D texture in response to the selected object and perform 3D modeling based on the selected 3D texture. Alternatively, the specified algorithm may copy the selected object into a plurality of objects, may arrange the plurality of copied objects at a predetermine interval, and may stitch the objects to perform 3D modeling.

When the event which occurred is not an event associated with "patch fetch", in operation 521, the second processor 240 may determine whether the event which occurred is an event associated with "patch download". In connection with a patch download function, the second processor 240 may be configured to output a menu item or icon capable of selecting the patch download function on the second display 260. Alternatively, when a spherical content edit function is executed, the second processor 240 may execute the patch download function depending on a default setting (or automatically or basically). When the patch download function is executed, in operation 523, the second processor 240 may access a specified server. Alternatively, the second processor 240 may output an input window associated with inputting a server address. After accessing the server, the second processor 240 may receive a server page capable of downloading at least one patch item from the server. In operation 525, the second processor 240 may output the server page on the second display 260. When a user input associated with selecting a patch item of the server page occurs, in operation 527, the second processor 240 may receive a patch image corresponding to the selected patch item from the server. The second processor 240 may store a patch provided from the server in a specified area of a second memory 230 and may apply the corresponding patch to a central point of spherical content.

According to various embodiments, a method for editing spherical content may include displaying spherical content, at least a portion of which is provided in the shape of a portion of a sphere with respect to a central point, detecting a central point of the spherical content, and outputting a specified patch image on the central point of the spherical content in response to a user input.

According to various embodiments, the method may further include outputting a patch list including patch items corresponding to at least one patch image.

According to various embodiments, the method may further include converting an image selected in response to a user input into a circular or spherical shape capable of being disposed on the central point of the spherical content and providing the circular or spherical shape as the patch image.

According to various embodiments, the method may further include accessing a server which provides a patch image in response to a user input, receiving a user input for selecting a patch item included in a server page, and receiving a patch image corresponding to the patch item and arranging the received patch image on the central point.

According to various embodiments, the method may further include including and displaying the received patch item in a patch list.

According to various embodiments, the outputting may further include at least one of detecting the central point of the spherical content and adjusting arrangement of the spherical content such that the central point is located on the center of a screen, automatically adjusting and outputting a size of the patch image in response to a size of a structure image disposed on the central point of the spherical content, outputting a guide capable of adjusting at least one of a size and a color of the patch image, and extracting a color of a region adjacent to the central point where the patch image is output and applying the extracted color or a color similar to the extracted color to a color of the patch image.

According to various embodiments, the method may further include any one of outputting a view screen where at least a portion of the patch image is located on a central portion of a central lower end of a screen as the patch image is applied.

According to various embodiments, the method may further include displaying a recommendation patch item corresponding to a patch image of a specified item, based on at least one of tag information of the spherical content and a type of at least one object included in the spherical content.

Figure 6:
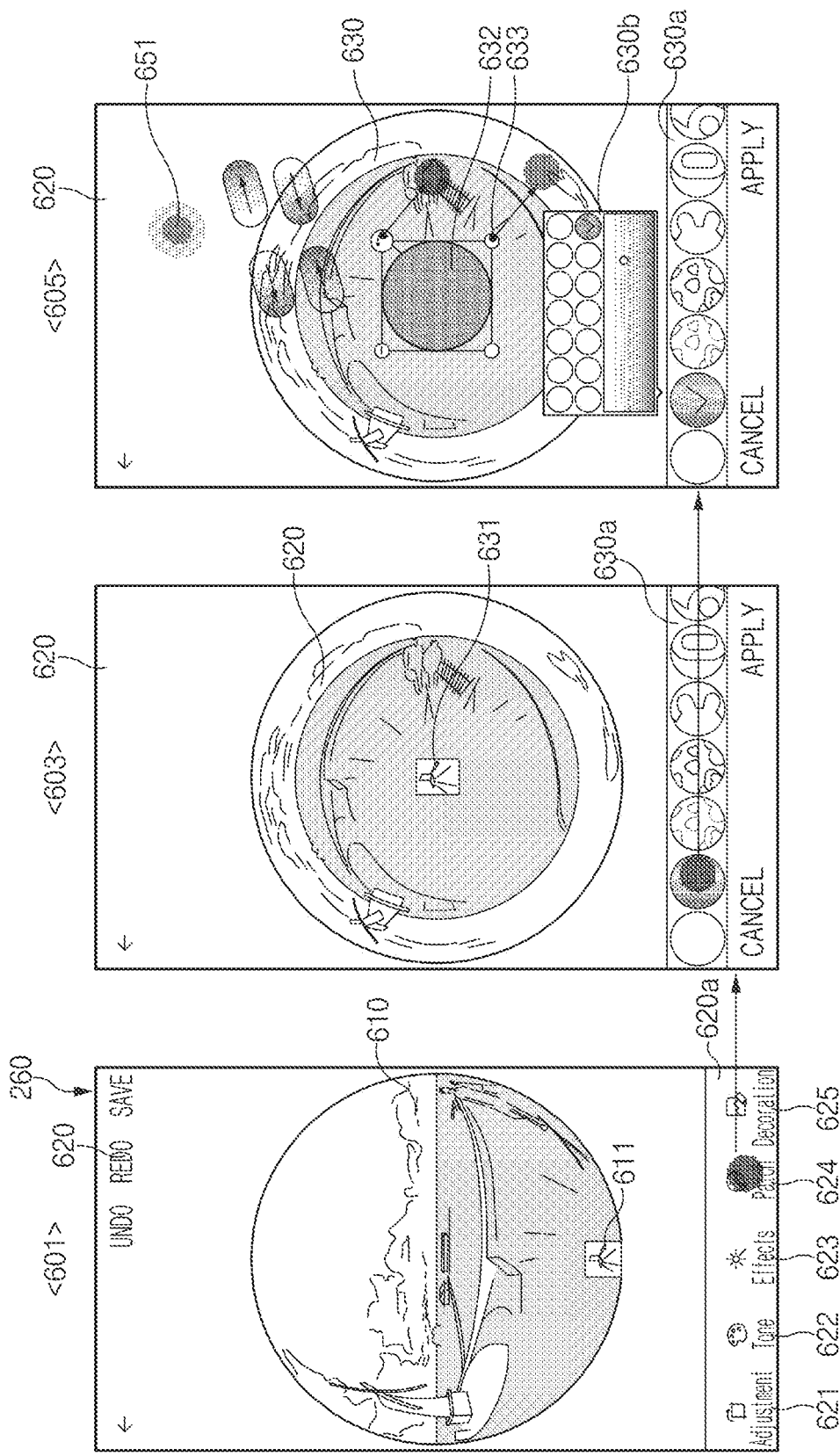
FIG. 6 illustrates an example of a screen interface for editing spherical content according to an embodiment of the present disclosure.

FIG. 6 illustrates an example of a screen interface for editing spherical content according to an embodiment of the present disclosure.

Referring to FIG. 6, in response to a request to output spherical content, like screen 601, a terminal electronic device 200 may output spherical content, including a mirror ball viewing image 610 in the form of a circular image and a background 620, on a second display 260. As shown, the mirror ball viewing image 610 may be an image which displays a region away from a start point of image capture, the start point of the image capture of a camera being located at a lower end of the center of a screen.

The background 620 may be located to cover the mirror ball viewing image 610 and may be displayed in a specified color (e.g., a white color or a black color). Alternatively, the background 620 may have a color different from main colors of the mirror ball viewing image 610 to easily recognize the mirror ball viewing image 610. For example, the background 620 may have a complementary color for highlighting a main color applied to the mirror ball viewing image 610. In this regard, a second processor 240 may extract a main color of the mirror ball viewing image 610 and may apply a color complementary to the extracted main color to the background 620. The second processor 240 of the terminal electronic device 200 may reprocess the extracted color and may provide a similar color to reduce a color difference between the mirror ball viewing image 610 and an ambient color. For example, the second processor 240 may provide at least one of colors adjacent within a specified distance from a color extracted from a color coordinate system (e.g., when the extracted color is a green color, a yellowish green color, a blue-green color, and the like similar to the green color) as a similar color.

According to various embodiments, edit items 620a associated with editing spherical content may be located at one side of the background 620. The edit items 620a may include, for example, an adjustment item 621, a tone item 622, an effects item 623, a patch item 624, a decoration item 625, and the like of the spherical content.

When the patch item 624 is selected among the edit items 620a, the second display 260 may output a patch applying screen like screen 603. The patch applying screen may include a top-view image 630 and the background 620.

The top-view image 630 may include an image to which a direction facing the central point from the outside of the spherical content is applied, the central point of the spherical content (e.g., the star point of the image capture of the camera) being located on the center of a screen. In response to this, the top-view image 630 may include a structure image 631 disposed on a certain location (e.g., the central point). The structure image 631 may correspond to at least a portion of a structure around the camera applied when the spherical content is generated, for example, a tripod for supporting the camera, a hand of a user, or the like.

A patch list 630a may be displayed on one side of the background 620. The patch list 630a may include at least one 2D or 3D image capable of replacing the structure image 631. When a specific image is selected in the patch list 630a in response to a user input, like screen 605, a patch image 632 may be located to cover the structure image 631. The patch image 632 may have, for example, a specified size and shape and a specific color. In addition, the second processor 240 may output a color change table 630b capable of changing a color of the patch image 632 on one side of the second display 260. The second processor 240 may output an adjustment guide 633 capable of adjusting a size and direction of the patch image 632 on a region adjacent to the patch image 632. When a touch event associated with the adjustment guide 633 occurs, the second processor 240 may adjust and display sizes and directions of the adjustment guide 633 and the patch image 632.

According to various embodiments, the second processor 240 may change a display state of the top-view image 630 in response to a touch input which occurs on the top-view image 630, the background 620, or a boundary region between the top-view image 630 and the background 620. For example, when a first touch input (e.g., a pinch zoom-in input) occurs, the second processor 240 may output an image zooming in on the top-view image 630. In this operation, the second processor 240 may maintain the entire size of the top-view image 630 and may more zoom in on and display a portion of a central point. Thus, the terminal electronic device 200 may provide an effect of taking a nearer view of the portion of the central point of the top-view image 630.

When a second touch input (e.g., a pinch zoom-out input) occurs, the second processor 240 may output an image zooming out on the top-view image 630. In this operation, the second processor 240 may maintain the entire size of the top-view image 630 and may zoom out on and display the portion of the central point and a portion of a certain size including the central point (e.g., an adjacent portion within a certain distance from the central point) as compared with a previous state. Thus, the terminal electronic device 200 may provide an effect of relatively distantly seeing the portion of the central point of the top-view image 630. In addition, when a third touch input 651 (e.g., an input for touching a certain region of the background 620) occurs, the second processor 240 may return to a previous screen state (e.g., screen 603 or 601).

According to various embodiments, the second processor 240 may determine a size of the structure image 631 disposed on the central point and may automatically generate the patch image 632 of a size capable of covering all the size of the structure image 631, thus applying the patch image 632 to screen 605.

According to various embodiments, the terminal electronic device 200 may output a control object capable of operating a patch image in a patch image. The patch image operation control object may be provided in various forms depending on, for example, a type of spherical content. The control object may include a function of rotating the patch image or adjusting a size of the patch image in the spherical content. Furthermore, the control object may include a function capable of changing viewing of a patch image (e.g., a mirror ball viewing image or a top-view image). Moreover, the control object may provide a function of entering text in the patch image or drawing an image.

Figure 7:
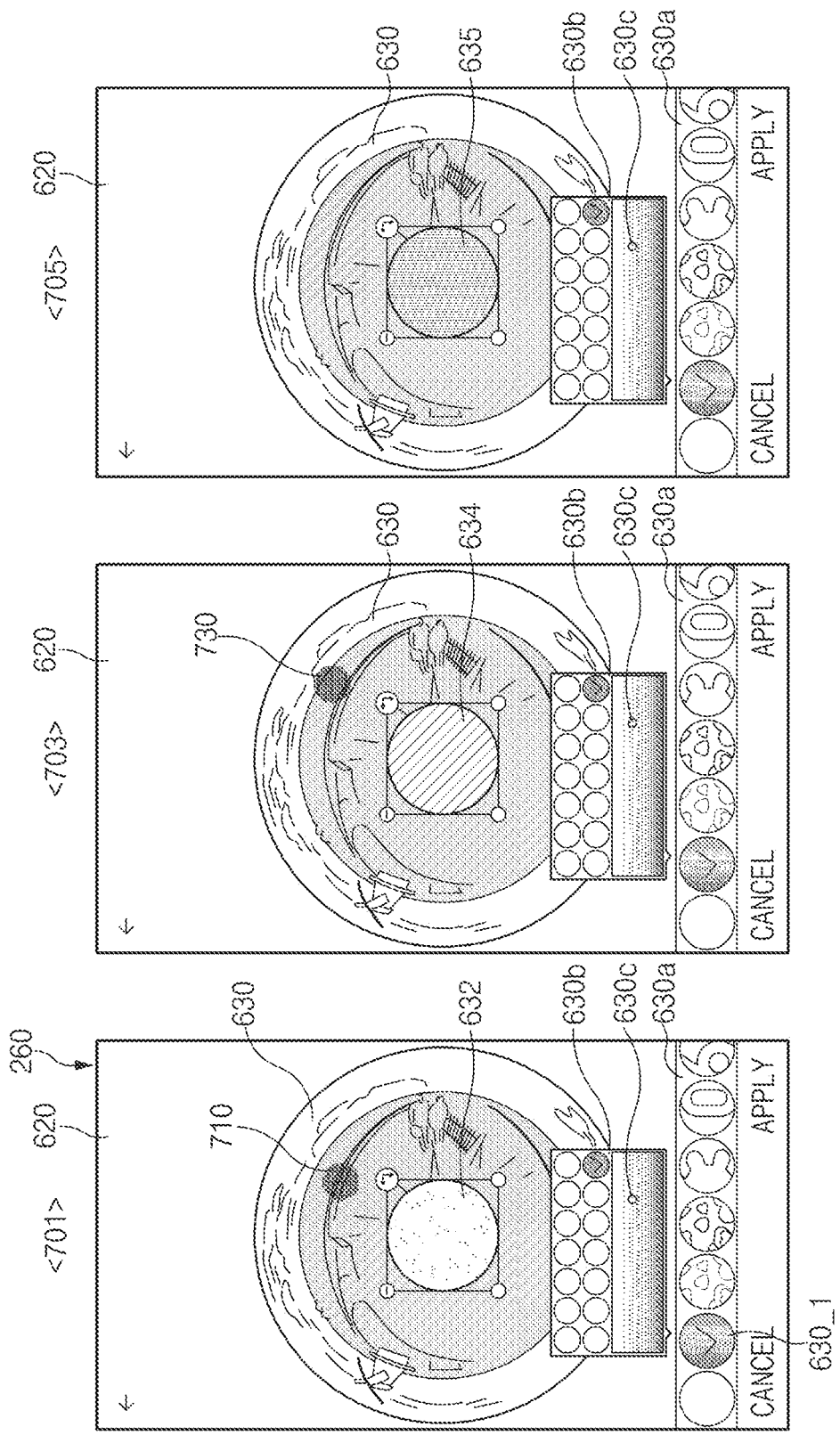
FIG. 7 illustrates an example of a screen interface associated with applying a patch according to an embodiment of the present disclosure.

FIG. 7 illustrates an example of a screen interface associated with applying a patch according to an embodiment of the present disclosure.

Referring to FIG. 7, as described above in FIG. 6, when at least one patch item 630_1 is selected in a patch list 630a, like screen 701, a second processor 240 may output a screen, on which a first patch image 632 corresponding to the selected patch item 630_1 is disposed at a specified size on a certain point of a top-view image 630 (e.g., a central point of spherical content), on a second display 260. A background 620 may be dispose around the top-view image 630, and the patch list 630a may be output on a certain region of the background 620. When the specific patch item 630_1 is selected in the patch list 630a, the second processor 240 may output a color change table 630b capable of changing a color of the selected patch item 630_1. In this operation, the second processor 240 may output a color of a certain region adjacent to the central point on which the first patch image 631 is located, automatically or in response to a user input. In this regard, the second processor 240 may output an eyedropper icon or an eyedropper menu associated with automatically apply a color on a certain region of the second display 260.

When an eyedropper function is executed in response to selecting the eyedropper menu, like screen 701, the second processor 240 may display an eyedropper object 710 on a certain region of the top-view image 630 (e.g., a region adjacent to a region where the first patch image 631 is located). The eyedropper object 710 may change in location in response to a user input. When the location is changed, the second processor 240 may extract a color of a point where the eyedropper object 710 is disposed. When the color is extracted in connection with the eyedropper object 710, the corresponding color may be applied to a patch image, and, like screen 703, a second patch image 634 may be displayed.

Like screen 703, when a touch input for selecting a certain region 730 of the top-view image 630 (e.g., a touch input on a region except for a region where the eyedropper object 710 is disposed) occurs, like screen 705, the second processor 240 may display a third patch image 635 to which a color corresponding to a location where the eyedropper object 710 is located or the certain region 730 indicated by the touch input is applied. Thus, a color of the third patch image 635 may change to a color similar to a color of a peripheral region. According to various embodiments, the second processor 240 may display an indicator 630c, associated with a color of the location where the eyedropper object 710 is disposed, on a certain region of the color change table 630b.

Figure 8:
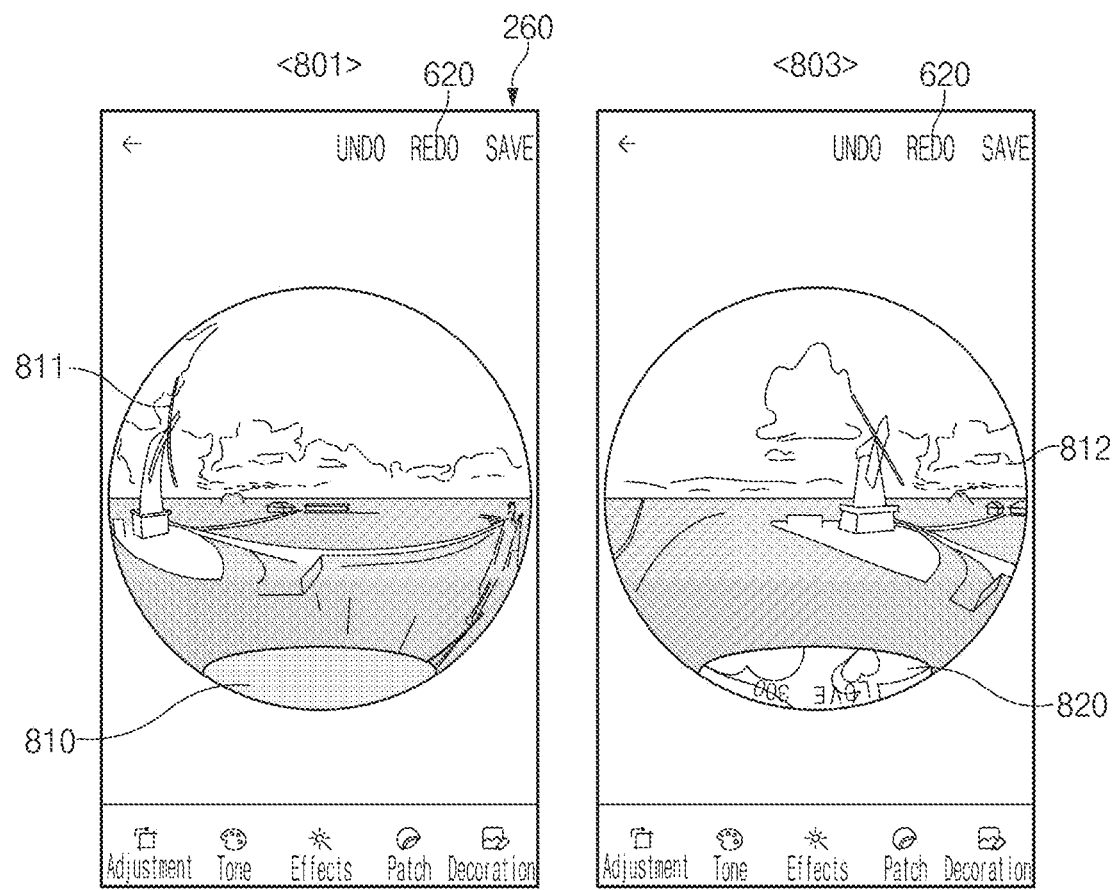
FIG. 8 illustrates an example of a screen to which a patch image is applied, according to an embodiment of the present disclosure.

FIG. 8 illustrates an example of a screen to which a patch image is applied, according to an embodiment of the present disclosure.

Referring to FIG. 8, a display 260 of a second terminal electronic device 200 of the present disclosure may output a circular image in which a patch image is applied to a central point of spherical content on a second display 260. For example, like screen 801, a second processor 240 may output a first mirror ball viewing image 811, in which a first patch image 810 is applied to the central point of the spherical content, together with a background 620 on the second display 260. While the spherical content is output as the first mirror ball viewing image 811, the first patch image 810 may be located at a certain size on a central portion of a central lower end of the circular image. At this time, as shown, the first patch image 810 may be displayed in a disk shape, upper and lower portions of which have a symmetric relationship, while displayed in the direction of an angle at which a camera captures a form disposed on the central point of the spherical content.

According to various embodiments, a patch image may include text. Spherical content to which a second patch image 820 including text is applied may be displayed like screen 803. Seeing screen 803, while the second patch image 820 is located on the center of a central lower end of a screen, a second mirror ball viewing image 812 may be displayed together with the background 620. Since the second patch image 820 has a form including the text, the text may be bent and displayed on the center of the central lower end of the screen.

Figure 9:
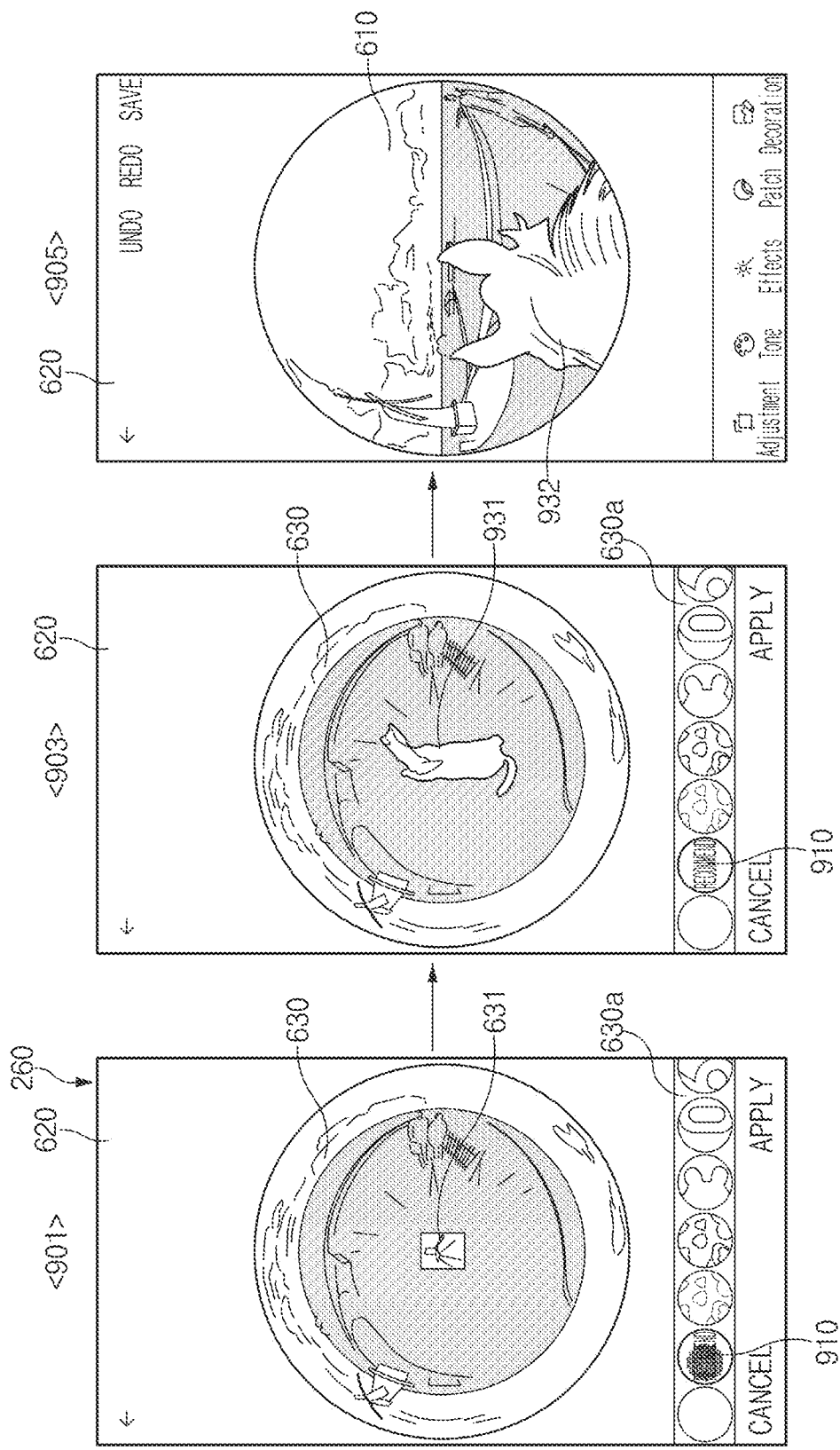
FIG. 9 illustrates an example of a screen interface associated with fetching a patch according to an embodiment of the present disclosure.

FIG. 9 illustrates an example of a screen interface associated with fetching a patch according to an embodiment of the present disclosure.

Referring to FIG. 9, when an input event associated with editing spherical content occurs, like screen 901, a second display 260 may output a background 620 and a top-view image 630. A structure image 631 may be located on a central point of the top-view image 630. Furthermore, the second display 260 may output a patch list 630a as a patch function is applied. The patch list 630a may include a patch item 910 generated by image conversion. In this regard, a terminal electronic device 200 may provide a screen interface associated with image conversion.

When the patch item 910 is selected on screen 901, like screen 903, the second display 260 may display the structure image 631 located to cover a patch image 931 corresponding to the selected patch item 910. According to various embodiments, the second display 260 may further output a guide capable of adjusting a size and direction of the pitch image 931. According to a user input for requesting to adjust the guide, the patch image 931 (e.g., an image of a horse) may change in size and arrangement direction.

In a state where the patch image 931 is applied, when an input event for changing a type of a viewing image (e.g., an event for requesting to change to an initial screen for outputting spherical content) occurs, like screen 905, the second display 260 may output a mirror ball viewing image 610 of a shape where a converted patch image 932 (e.g., a portion of the patch image 931 (e.g., a head portion of the horse)) is located on the center of a central lower end of a circular image. According to various embodiments, when an input event for requesting to rotate a direction of the mirror ball viewing image 610 (e.g., rotate in a left or right direction) occurs (e.g., when a user input is received), the second display 260 may display a form where another portion of the converted patch image 932 (e.g., a side portion of the horse, a tail of the horse, or the like) is located on a central portion of a central lower end of the mirror ball viewing image 610.

According to various embodiments, the terminal electronic device 200 may automatically recommend a patch item based on analyzing tag information of spherical content or an object included in the spherical content. For example, when the spherical content is content captured in the beach or the like, the terminal electronic device 200 may include and display a patch item corresponding to a marine animal (e.g., a turtle, a whale, or the like), a patch item corresponding to an oceanic facility (e.g., a ship, a lighthouse, or the like), or the like in the patch list 630a. Alternatively, when the spherical content is content captured in the meadow, the terminal electronic device 200 may include and output a patch item 910 corresponding to a horse image in the patch list 630a. Alternatively, when the spherical content is content captured in the desert, the terminal electronic device 200 may include and output a patch item 910 corresponding to an image of a camel or the like in the patch list 630a.

According to various embodiments, the terminal electronic device 200 may display information, associated with an image which is currently being displayed, on the second display 260. For example, the terminal electronic device 200 may output tag information of the spherical content (e.g., a location where the spherical content is generated, a time when the spherical content is generated, weather where the spherical content is generated, text information entered in connection with the spherical content, or the like) at a specified location of the second display 260, together with the spherical content or through a separate pop-up window or a separate page. Alternatively, the terminal electronic device 200 may output description information associated with spherical content which is currently being displayed (e.g., tile information of the spherical content, information of a terminal which generates the spherical content, information of a producer of the spherical content, information for describing types of objects included in the spherical content, or the like).

As described above, the terminal electronic device 200 of the present disclosure may increase completeness of the spherical content and may provide more natural content to be appreciated, by removing the structure image 631 which is not matched with surroundings from the center of spherical content and arranging a patch image which is assimilated into the surroundings.

Figure 10:
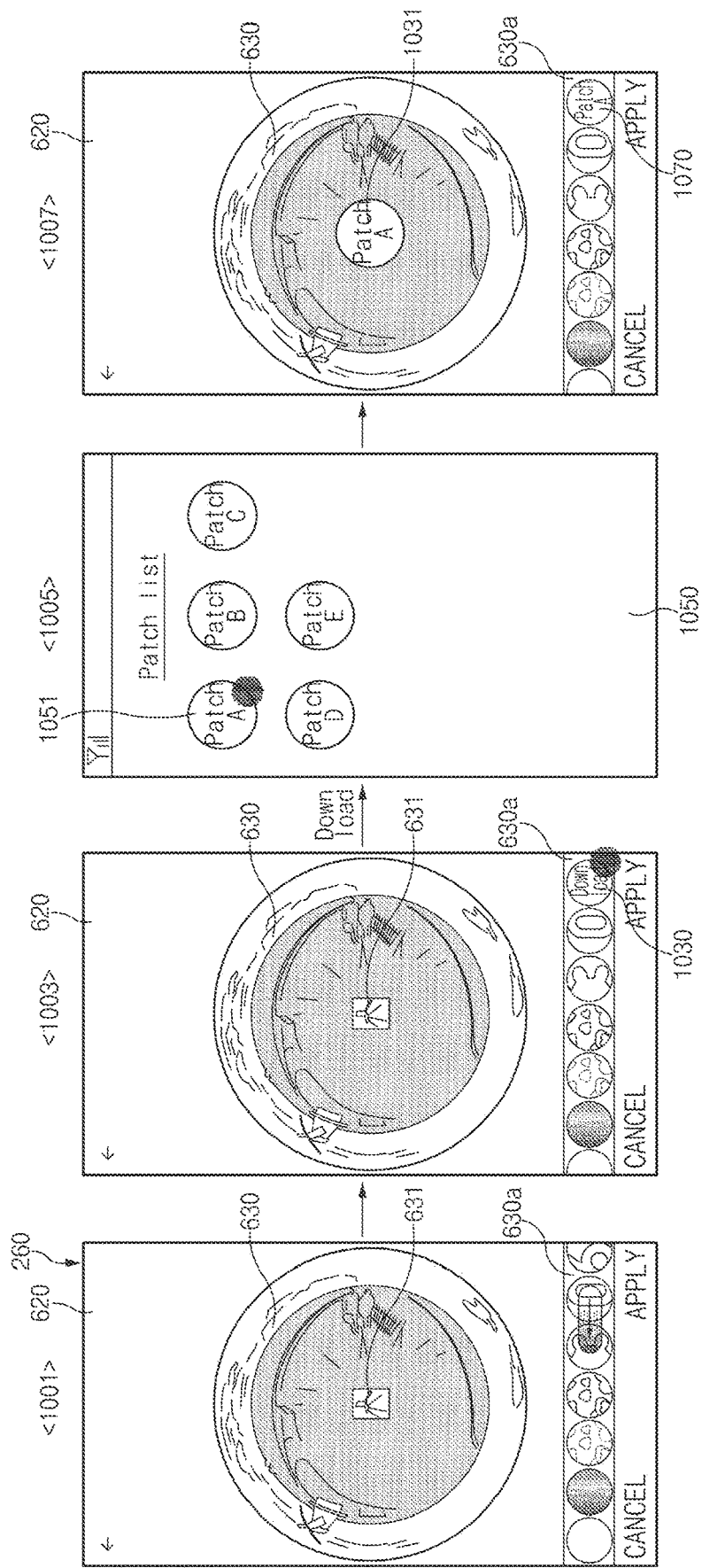
FIG. 10 illustrates an example of a screen interface associated with downloading a patch item according to an embodiment of the present disclosure.

FIG. 10 illustrates an example of a screen interface associated with downloading a patch item according to an embodiment of the present disclosure.

Referring to FIG. 10, when an input event associated with a patch function among functions of editing spherical content occurs, like screen 1001, a second display 260 may output a background 620 and a circular image (e.g., a top-view image 630). Furthermore, the second display 260 may output a patch list 630a. A structure image 631 may be located on a central point of the top-view image 630. When a touch input (e.g., lateral scroll) occurs on the patch list 630a, like screen 1003, the second display 260 may change items of the patch list 630a in response to a touch input. In response to this, the patch list 630a may display a patch download item 1030.

When the patch download item 1030 is selected, like screen 1005, a terminal electronic device 200 may access a specified server and may output a server page capable of selecting a patch item provided from the corresponding server. The server page may include, for example, items associated with a plurality of patch images. When a first item 1051 is selected among a plurality of items, the terminal electronic device 200 may provide an input event corresponding to selecting the first item 1051 to the server page and may receive a patch image corresponding to the first item 1051 from the server page. Alternatively, the terminal electronic device 200 may store a patch image corresponding to the first time 1051 in its memory.

When the reception of the first item 1051 is completed, like screen 1007, a second display 260 of the terminal electronic device 200 may output a first patch image 1031 corresponding to the first patch item 1051 on a certain point of the top-view image 630 (e.g., a central point where the structure image 631 is located). Furthermore, the patch list 630a may include and display a first patch item 1070.

According to various embodiments, an electronic device may include a memory storing spherical content, at least a portion of which is provided in the shape of a portion of a sphere with respect to a central point, a display configured to output the spherical content, and a processor configured to be electrically connected with the memory and the display. The processor may be configured to arrange a specified patch image on a central point of the spherical content in response to a user input.

According to various embodiments, the processor may be configured to output a patch list including patch items corresponding to at least one patch image.

According to various embodiments, the processor may be configured to convert an image selected in response to a user input into a circular or spherical shape capable of being located on the central point of the spherical content.

According to various embodiments, the processor may be configured to access a server which provides a patch image in response to a user input and output a server page provided from the server.

According to various embodiments, the processor may be configured to receive a patch image corresponding to the patch item in response to a user input for selecting a patch item included in the server page and arrange the received patch image on the central point.

According to various embodiments, the processor may be configured to include and display the selected patch item in a patch list.

According to various embodiments, the processor may be configured to detect the central point of the spherical content and adjust a state where the spherical content is displayed such that the central point is located on the center of a screen.

According to various embodiments, the processor may be configured to output a viewing image in which at least a portion of the patch image is located on a central portion of a central lower end of a screen.

According to various embodiments, the processor may be configured to automatically adjust and output a size of the patch image in response to a size of a structure image located on the central point of the spherical content.

According to various embodiments, the processor may be configured to output a guide capable of adjusting at least one of a size and a color of the patch image.

According to various embodiments, the processor may be configured to extract a color a region adjacent to the central point where the patch image is output and change the extracted color to be the same or similar to a color of the patch image.

According to various embodiments, the processor may be configured to display a recommendation patch item corresponding to a patch image of a specified form based on at least one of tag information of the spherical content and a type of at least one object included in the spherical content.

Figure 11:
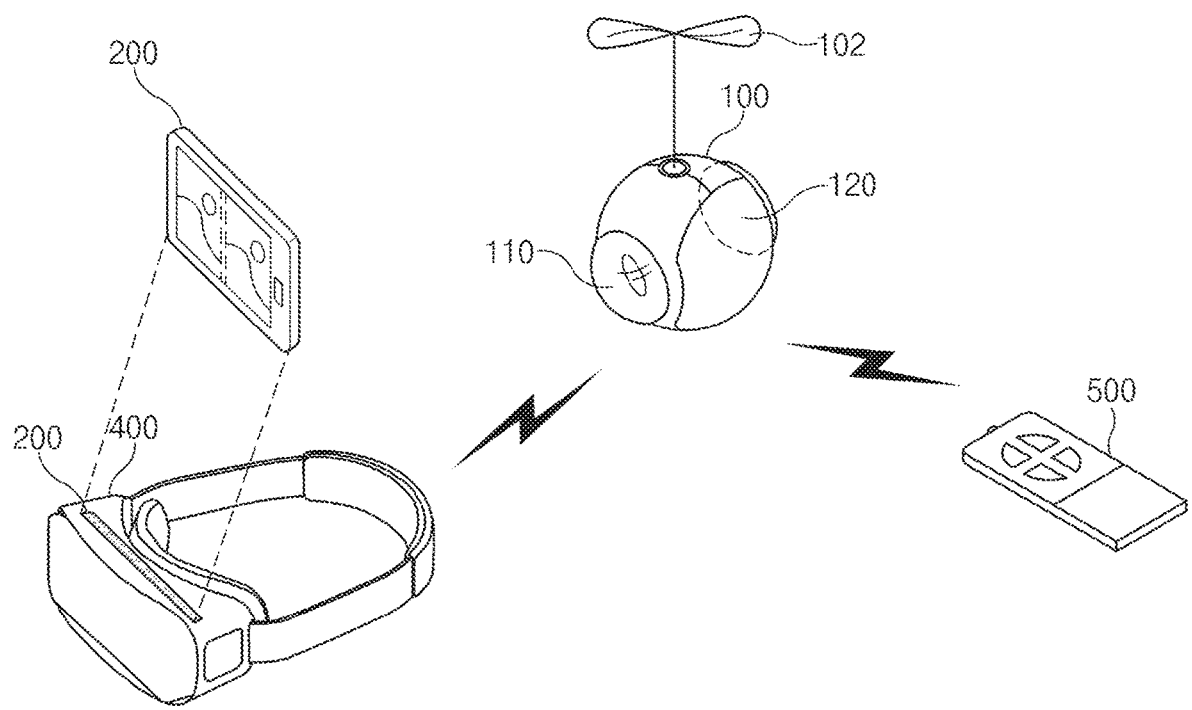
FIG. 11 illustrates another example of a spherical content operation system according to another embodiment of the prevent disclosure.

FIG. 11 illustrates another example of a spherical content operation system according to another embodiment of the prevent disclosure.

Referring to FIG. 11, the spherical content operation system according to another embodiment of the prevent disclosure may include an image acquisition device 100, a terminal electronic device 200, and a head mount device 400 capable of mounting the terminal electronic device 200. According to various embodiments, the spherical content operation system may further include a remote controller 500.

The image acquisition device 100 may include a plurality of cameras 110 and 120 and may obtain an image in response to at least one of a user input, a control signal of the terminal electronic device 200 which is communicatively connected, or a control signal of the remote controller 500. The image acquisition device 100 may store the obtained image or may transmit the obtained image to the terminal electronic device 200. The image acquisition device 100 may be the same or similar device to an image acquisition device described in FIGS. 1 and 2. Additionally or alternatively, the image acquisition device 100 may include a wing portion 102. The wing portion 102 may generate a lift force capable of floating the image acquisition device 100 from the ground over a certain distance. Thus, the image acquisition device 100 may collect spherical content in response to a control signal of the terminal electronic device 200 or the remote controller 500 in a state where it floats up to a specified height from the ground.

The terminal electronic device 200 may establish a communication channel with the image acquisition device 100 and may receive an image from the image acquisition device 100. The terminal electronic device 200 may output virtual VR content (or a virtual VR image) based on an image provided from the image acquisition device 100 (e.g., images obtained by the first camera 110 and the second camera 120). The virtual VR content may be output based on, for example, a closed curve image in which edges of a first camera image and a second camera image are stitched to each other. The virtual VR content may include an image provided to divide and output at least a partial region which is currently displayed in the closed curve image into a left-eye region and a right-eye region. The terminal electronic device 200 may output virtual VR content on its terminal display. In this operation, the terminal electronic device 200 may provide a patch function capable of applying the patch image described above. In this regard, the terminal electronic device 200 may divide a screen and may output a portion of the same virtual VR content on each of the divided regions (e.g., a left-eye region and a right-eye region). The terminal electronic device 200 may maintain the left-eye region and the right-eye region to be separated by a certain width and may output a specified image on the corresponding width or may output a partial image of a right edge of the left-eye region and a partial image of a left edge of the right region.

When a user wears the head mount device 400 equipped with the terminal electronic device 200, the terminal electronic device 200 may output a partial region of a closed curve image as virtual VR content. When a user input occurs (e.g., when the terminal electronic device 200 rotates according to head rotation, body rotation, or the like—a sensor of the terminal electronic device 200 or a sensor included in the head mount device 400 senses and determines it), the terminal electronic device 200 may select at least one patch item in response to an input direction (e.g., up and down and left and right or a diagonal direction) and may apply a patch image corresponding to the selected patch item to a central point of spherical content.

According to various embodiments, when the terminal electronic device 200 is mounted on the head mount device 400, it may convert and output a closed curve image stored in its memory into virtual VR content depending on settings or a user input. Alternatively, in a state prepared to output virtual VR content, the terminal electronic device 200 may automatically output the virtual VR content when mounted on the head mount device 400. According to various embodiments, the terminal electronic device 200 may convert and output a closed curve image into virtual VR content in real time based on an image (e.g., a first camera image and a second camera image) transmitted from the image acquisition device 100. As the terminal electronic device 200 is mounted on the head mount device 400, physical combination may be performed, such that the terminal electronic device 200 recognizes the insertion of the head mount device 400.

The head mount device 400 may include a device, on which the terminal electronic device 200 is mounted, capable of viewing a screen output on a second display 260 of the terminal electronic device 200 with left and right eyes. In this regard, as shown, the head mount device 400 may include a structure, such as a belt, capable of being worn on a head of the user, and may include a region capable of mounting the terminal electronic device 200. The head mount device 400 may be operatively connected with the mounted terminal electronic device 200 and may further include a button, a touch pad, or the like capable of generating an input signal associated with controlling the terminal electronic device 200.

The remote controller 500 may be communicatively connected with the image acquisition device 100 based on a short range communication module (e.g., a Bluetooth communication module) and may transmit a signal associated with controlling the image acquisition device 100 in response to a user input. Alternatively, the remote controller 500 may generate and transmit a signal of a specified frequency band (e.g., a frequency band the image acquisition device 100 may receive). The remote controller 500 may include at least one physical button, a touch pad, or the like and may transmit a signal corresponding to a user input to the image acquisition device 100. Thus, in a state where the user wears the head mount device 400 on which the terminal electronic device 200 is received, he or she may control to obtain and transmit an image of the image acquisition device 100 under control of the remote controller 500.

As described above, the spherical content operation system according to an embodiment of the present disclosure may support to store an image (e.g., spherical content) transmitted from the image acquisition device 100 in the terminal electronic device 200, convert the stored image into virtual VR content capable of being executed by the head mount device 400, and output the virtual VR content on the terminal electronic device 200. Furthermore, while verifying spherical content of the terminal electronic device 200 using the head mount device 400, the spherical content operation system may convert a structure image located on a central point of the obtained spherical content into a patch image.

Figure 12:
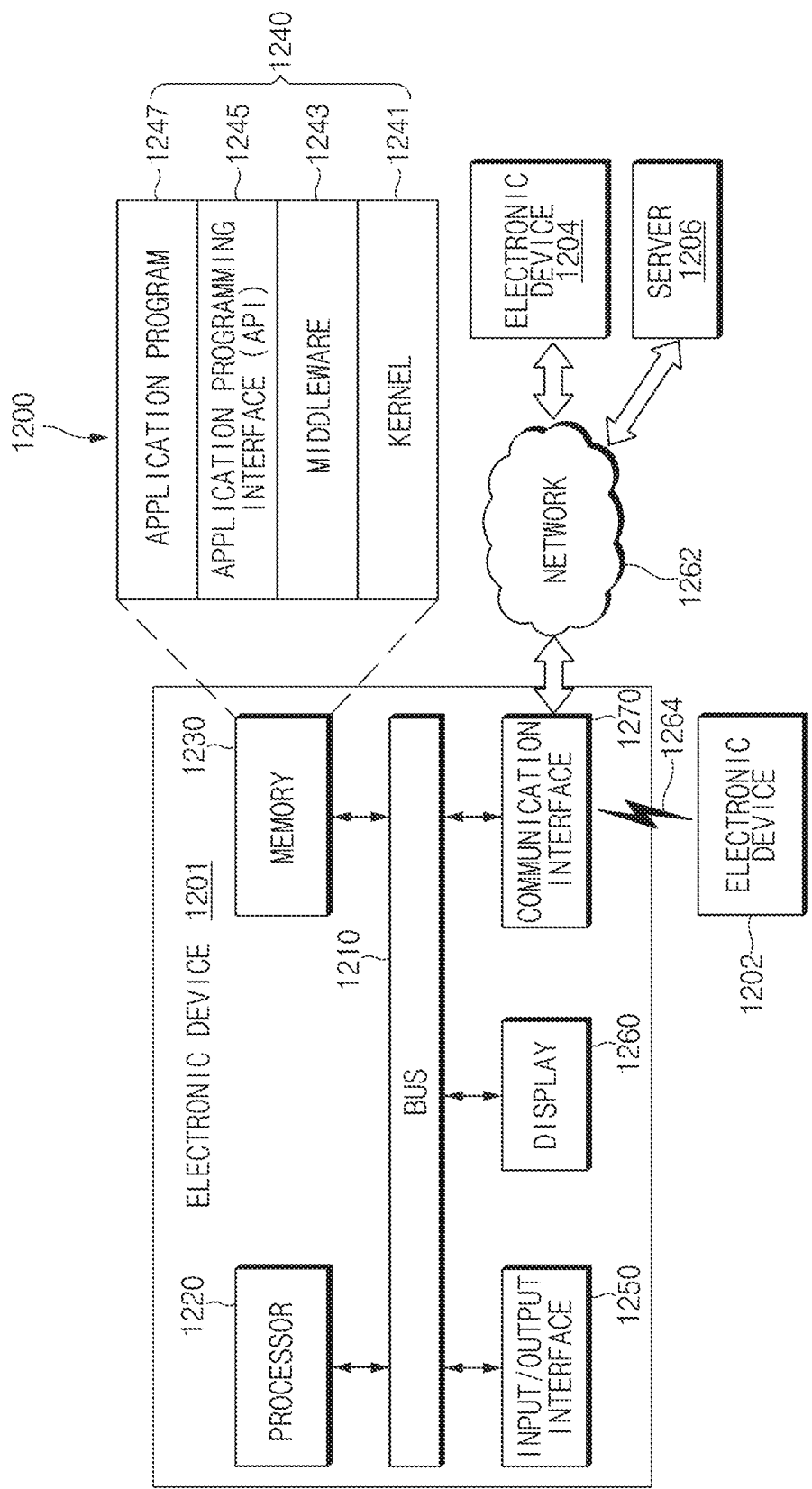
FIG. 12 illustrates an example of a network environment related to an operation of a terminal electronic device, according to an embodiment of the present disclosure.

FIG. 12 illustrates an example of a network environment related to an operation of a terminal electronic device, according to an embodiment of the present disclosure.

Referring to FIG. 12, according to various embodiments, a terminal electronic device 1201 in a network environment 1200 is described. The terminal electronic device 1201 (e.g., the electronic device 10) may include a bus 1210, a processor 1220, a memory 1230, an input/output interface 1250, a display 1260, and a communication interface 1270. According to an embodiment, the terminal electronic device 1201 may not include at least one of the above-described components or may further include other component(s). The bus 1210 may interconnect the above-described components 1220 to 1270 and may include a circuit for conveying communications (e.g., a control message and/or data) among the above-described components. The processor 1220 may include one or more of a central processing unit (CPU), an application processor (AP), or a communication processor (CP). For example, the processor 1220 may perform an arithmetic operation or data processing associated with control and/or communication of at least other components of the terminal electronic device 1201.

The memory 1230 may include a volatile and/or nonvolatile memory. For example, the memory 1230 may store commands or data associated with at least one other component(s) of the terminal electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system". For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete components of the terminal electronic device 1201 so as to control or manage system resources.

The middleware 1243 may perform, for example, a mediation role such that the API 1245 or the application program 1247 communicates with the kernel 1241 to exchange data. Furthermore, the middleware 1243 may process task requests received from the application program 1247 according to a priority. For example, the middleware 1243 may assign the priority, which makes it possible to use a system resource (e.g., the bus 1210, the processor 1220, the memory 1230, or the like) of the terminal electronic device 1201, to at least one of the application program 1247 and may process the one or more task requests. The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like. For example, the input/output interface 1250 may transmit a command or data input from a user or another external device, to other component(s) of the terminal electronic device 1201 or may output a command or data, received from other component(s) of the terminal electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the terminal electronic device 1201 and an external device (e.g., the first external terminal electronic device 1202, the second external terminal electronic device 1204, or the server 1206). For example, the communication interface 1270 may be connected to the network 1262 over wireless communication or wired communication to communicate with the external device (e.g., the second external terminal electronic device 1204 or the server 1206).

The wireless communication may include cellular communication which uses at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. According to an embodiment, the wireless communication may include, for example, at least one of wireless fidelity (Wi-Fi), Bluetooth, Bluetooth low energy (BLE), Zigbee, near field communication (NFC), magnetic secure transmission (MST), a radio frequency (RF), or area body network (ABN). According to an embodiment, the wireless communication may include GNSS. The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), power-line communication, a plain old telephone service (POTS), or the like. The network 1262 may include at least one of telecommunications networks, for example, a computer network (e.g., LAN or WAN), an Internet, or a telephone network. Alternatively, the terminal electronic device 1201 may communicate with the first terminal electronic device 1202 based on short-range communication.

Each of the first and second external terminal electronic devices 1202 and 1204 may be a device of which the type is different from or the same as that of the terminal electronic device 1201. According to various embodiments, all or a portion of operations that the terminal electronic device 1201 will perform may be executed by another or plural electronic devices (e.g., the terminal electronic device 1202 or 1204 or the server 1206). According to an embodiment, in the case where the terminal electronic device 1201 executes any function or service automatically or in response to a request, the terminal electronic device 1201 may not perform the function or the service internally, but, alternatively additionally, it may request at least a portion of a function associated with the terminal electronic device 1201 from another device (e.g., the terminal electronic device 1202 or 1204 or the server 1206). The other electronic device (e.g., the terminal electronic device 1202 or 1204 or the server 1206) may execute the requested function or additional function and may transmit the execution result to the terminal electronic device 1201. The terminal electronic device 1201 may provide the requested function or service using the received result or may additionally process the received result to provide the requested function or service. To this end, for example, cloud computing, distributed computing, or client-server computing may be used.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1220), may cause the one or more processors to perform a function corresponding to the instruction. The computer-readable storage media, for example, may be the memory 1230.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device, comprising:
a memory configured to store spherical content, at least a portion of the spherical content being provided in a shape of at least a portion of a sphere with respect to a central point of the spherical content;
a display; and
a processor electrically connected with the memory and the display, the processor being configured to:
control the display to display the spherical content,
based on an event associated with executing a patch function occurring while displaying the spherical content, detect a location of the central point of the spherical content,
display a recommended patch item corresponding to a patch image to edit the spherical content, based on analyzing information associated with the spherical content,
receive a user input for selecting the recommended patch item, and
arrange the patch image corresponding to the selected patch item on the central point of the spherical content when outputting the patch image on the display in response to a user input.

2. The electronic device of claim 1, wherein the processor is further configured to control the display to display a patch list including patch items corresponding to at least one patch image capable of being located on the central point of the spherical content.

3. The electronic device of claim 1, wherein the processor is further configured to:
in response to a user input selecting an image, convert the image into a circular shape or a spherical shape capable of being located on the central point of the spherical content, and
provide the circular shape or the spherical shape as the patch image.

4. The electronic device of claim 1, wherein the processor is further configured to:
in response to a user input, access a server providing the patch image, and
output a server page capable of selecting a patch item corresponding to the patch image.

5. The electronic device of claim 4, wherein the processor is further configured to:
in response to a user input selecting the patch item included in the server page, receive the patch image corresponding to the patch item, and
arrange the received patch image on the central point of the spherical content.

6. The electronic device of claim 4, wherein the processor is further configured to control the display to display the patch item in a patch list.

7. The electronic device of claim 1, wherein the processor is further configured to:
adjust a state where the spherical content is displayed such that the central point of the spherical content is located on a center of a screen, and
perform one of:
output a viewing image in which at least a portion of the patch image is located on a central portion of a central lower end of the screen, as the patch image is applied; or
in response to a size of a structure image located on the central point of the spherical content, automatically adjust and output a size of the patch image.

8. The electronic device of claim 1, wherein the processor is further configured to output a guide capable of adjusting at least one of a size, a shape, or a color of the patch image.

9. The electronic device of claim 1, wherein the processor is further configured to:
extract a color of an adjacent region within a specified distance from the central point of the spherical content where the patch image is output, and
change a color of the patch image to be same as or similar to the extracted color.

10. The electronic device of claim 1, wherein the processor is further configured to control the display to display a recommendation patch item corresponding to the patch image of a specified form based on at least one of tag information of the spherical content or a type of at least one object included in the spherical content.

11. The electronic device of claim 1, wherein the processor is further configured to:
recommend a patch item corresponding to the patch image of a specified item, based on at least one of tag information of the spherical content or a type of at least one object included in the spherical content, and
display the patch item.

12. The electronic device of claim 1, wherein the processor is further configured to, in response to the event associated with executing the patch function occurring while displaying the spherical content, control the display to display at least one of a menu item or an icon associated with editing the spherical content.

13. A method for editing spherical content, the method comprising:
displaying spherical content, at least a portion of the spherical content being provided in a shape of at least a portion of a sphere with respect to a central point of the spherical content;
based on an event associated with executing a patch function occurring while displaying the spherical content, detecting a location of the central point of the spherical content;
displaying a recommended patch item corresponding to a patch image to edit the spherical content, based on analyzing information associated with the spherical content;

receiving a user input for selecting the recommended patch item; and arranging the patch image corresponding to the selected patch item on the central point of the spherical content when outputting the patch image on the display in response to a user input.

14. The method of claim 13, further comprising:

outputting a patch list including patch items corresponding to at least one patch image; and in response to a user input selecting an image, converting the image into a circular shape or a spherical shape capable of being disposed on the central point of the spherical content and providing the circular shape or the spherical shape as the patch image.

15. The method of claim 13, further comprising:

in response to a user input, accessing a server providing a server page associated with the patch image;

receiving another user input for selecting a patch item included in the server page;

receiving the patch image corresponding to the patch item; and arranging the received patch image on the central point.

16. The method of claim 15, further comprising displaying the patch item in a patch list.

17. The method of claim 15, further comprising any one of:

adjusting arrangement of the spherical content such that the location of the central point of the spherical content is located on a center of a screen;

in response to a size of a structure image disposed on the central point of the spherical content, automatically adjusting and outputting a size of the patch image;

outputting a guide capable of adjusting at least one of the size of the patch image or a color of the patch image;

extracting a color of a region adjacent to the central point where the patch image is output and applying the extracted color or a color similar to the extracted color to the color of the patch image;

outputting a view screen where at least a portion of the patch image is located on a central portion of a central lower end of the screen as the patch image is applied; or displaying a recommendation patch item corresponding to the patch image of a specified item, based on at least one of tag information of the spherical content or a type of at least one object included in the spherical content.

18. An electronic device, comprising;

a memory configured to store spherical content, at least a portion of the spherical content being provided in a shape of at least a portion of a sphere with respect to a central point of the spherical content;

a display; and a processor electrically connected with the memory and the display, the processor being configured to:

control the display to display the spherical content, based on an event associated with editing the spherical content occurring while displaying the spherical content, detect a structure image located on the central point of the spherical content, generated a patch image capable of being located to cover the structure image, and arrange the patch image on the structure image.

* * * * *